United States Patent [19]

Post

[11] Patent Number: 5,406,299

[45] Date of Patent: Apr. 11, 1995

[54] HYBRID FIELD-SEQUENTIAL DISPLAY

[75] Inventor: David L. Post, Kettering, Ohio

[73] Assignee: The United States of America as represented by the Secretary of the Air Force, Washington

[21] Appl. No.: 715,868

[22] Filed: Jun. 17, 1991

Related U.S. Application Data

[63] Continuation-in-part of Ser. No. 358,214, May 30, 1989, abandoned.

[51] Int. Cl.$^6$ .............................................. G09G 3/02
[52] U.S. Cl. .............................................. 345/3; 345/7
[58] Field of Search ............. 340/705, 716, 702, 980; 358/103, 104, 250; 350/174; 345/3, 7

[56] References Cited

U.S. PATENT DOCUMENTS

| | | | |
|---|---|---|---|
| 4,427,977 | 1/1984 | Carollo et al. | 340/702 |
| 4,560,233 | 12/1985 | Banbury | 340/980 |
| 4,697,879 | 10/1987 | Gerbe | 340/705 |
| 4,832,449 | 5/1989 | Mundy et al. | 350/174 |
| 4,927,234 | 5/1990 | Banbury et al. | 350/174 |

FOREIGN PATENT DOCUMENTS

0194196  9/1986  European Pat. Off. ............ 340/705

OTHER PUBLICATIONS

M. N. Ernstoff; "Liquid crystal pictorial Display"; Info-Mania Conference; Nov. 6, 1975; pp. 28–36.

Jim E. Wurtz; "Applications of miniature CRT displays"; Information Display; pp. 16–18; Sep. 1987.

Primary Examiner—Richard Hjerpe
Assistant Examiner—M. Fatahiyar
Attorney, Agent, or Firm—Bernard E. Franz; Thomas L. Kundert

[57] ABSTRACT

The display combines an ordinary monochrome electronic visual display with a two-primary field-sequential display (FSD). This hybrid system provides full color, high spatial resolution, and high luminance. The FSD provides two of the three color primaries (i.e., red, green, and blue) using temporally separate color fields which alternate at twice the frame rate (e.g., 120 Hz). Its image is superimposed with the monochrome display's, which refreshes at a conventional frame rate (e.g., 60 Hz) and provides the third primary, thus yielding a full-color image. In this way, a full-color FSD is obtained without requiring the presentation of color fields at triple the frame rate (e.g., 180 Hz) or diminishing the FSD's luminous efficiency or color range. The system's maximum obtainable luminance is increased still further because the monochrome display's image does not timeshare with the other two primaries.

3 Claims, 1 Drawing Sheet

HYBRID FIELD-SEQUENTIAL DISPLAY

This application is a continuation-in-part of application Ser. No. 07/358,214, filed May 30, 1989, now abandoned.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a hybrid field-sequential display (HFSD) for video image simulation apparatus.

The development of miniature color displays that are suitable for helmet-mounted display (HMD) applications is very difficult. For monochrome HMD applications, the main approach has been to miniaturize the conventional monochrome display technology (i.e., the monochrome CRT), but this will not work for full-color applications. Conventional color-display technology is based on the shadowmask CRT, and this technology cannot be suitably miniaturized. Therefore, new approaches must be developed.

One solution is to use three monochrome displays, each of which displays an image in one of the three primary colors (i.e., red, green, and blue), and superimpose the images. This yields a full-color display having the same resolution as the component monochrome displays. However, the resulting device is bulky.

U.S. Pat. No. 4,427,977 to Carollo et al provides a teaching of a helmet mounted display simulator including a plurality of image generators equal in number to a plurality of controlled cathode ray tubes, each of which generates a monochrome image (red, green, and blue) to be transmitted and displayed to the viewer. The several monochrome images are combined by a set of dichroic prisms and transmitted by fiber optics.

Another approach is to build a miniature solid-state display, such as an LCD having a color-filter mosaic. Displays of this type are currently being used in commercial miniature television sets. The problem with this technology is that several pixels are required to form a full-color pixel, which makes it difficult to build a mosaic-filter LCD having a sufficient number of pixels for HMD applications. For example, a state-of-the-art color LCD having 1024×1024 pixels in a quad configuration provides a resolution of only 512×512 full-color pixels. Furthermore, if its image is presented in a 60-degree field-of-view (such as might be used for a wide field-of-view HMD), each pixel will subtend 3.5 arc-minutes of visual angle. Therefore, the individual pixels will be discernible and no spatial color mixture will occur in the observer's visual system. The need to miniaturize the HMD further complicates matters because this leads to very high pixel-density requirements.

Another approach is to use temporal integration in the observer's visual system to achieve full color. This technique is known as field-sequential presentation and involves presenting superimposed but temporally separate red, green, and blue images in rapid succession so that the visual system fuses them into a single, non-flickering, full-color image. The most common example of a full-color FSD is the single-gun, three-primary, penetration-tube CRT. The main problem with this technology is limited color gamut. Also, luminous efficiency suffers, relative to a two-primary penetration tube, because of the need for an additional phosphor-barrier layer. (It should be noted here that three-gun penetration tubes, which are not FSDs, can be built. However, it is not possible to fit three electron guns in a miniature package.)

A much older full-color FSD technology involves placing a rotating filter wheel in front of a white CRT and synchronizing image generation on the CRT with the filter's movement. It is impractical, of course, to place a rotating filter wheel on a helmet. The system can be installed elsewhere, though, and the image routed to the helmet via a fiber-optics cable. The main disadvantage is that resolution is then limited by the cable and will deteriorate as individual fibers break. If the helmet is to be removable from the cockpit, there are also difficulties associated with reconnecting the cable properly. Still another problem is that light-loss in the cable reduces image luminance, which is already diminished by the filters. In principle, this problem can be overcome by using a transmissive LCD (or other solid-state display) to generate the image, rather than a CRT. This is because an LCD's luminance can be increased by increasing its backlighting, whereas a CRT's luminance is ultimately limited by phosphor efficiency, beam current limitations, and beam-current vs. spot-size tradeoffs. The problem here is that, to achieve a 60-Hz frame rate, the color fields must be presented at 180 Hz, and no contemporary LCD (or other solid-state display technology) can support this refresh rate.

A more modern and compact version of the filter-wheel idea utilizes a liquid-crystal shutter. The shutter is essentially a spectrally selective polarizing liquid-crystal filter. Rotating the liquid-crystal to one orientation allows light from one portion of the spectrum (e.g. green) to pass and rotating 90 degrees allows light from another portion of the spectrum (e.g., red) to pass. The rotation can be very rapid and commercial two-primary displays which support a 60-Hz frame rate (120-Hz color-field rate) are currently being marketed. The shutter is also compact enough for helmet-mounted applications. In principle, a full-color system can be produced by sandwiching two shutters (e.g., a red/cyan plus a yellow/blue) together and increasing the color-field rate to 180 Hz, but this has not been demonstrated. (The basic problem is that the CRT's yoke must be cooled to run at such speed.) Another drawback is that the shutter wastes even more light than a rotating filter wheel because of light loss from the polarizers.

SUMMARY OF THE INVENTION

An objective of the invention is to provide apparatus to produce full-color high-resolution images using a relatively small display system. In particular, it is intended to provide the same resolution advantage as an ordinary three-primary *field-sequential display (FSD)* while requiring a lower refresh rate from its components and providing a superior color gamut and luminance.

The invention relates to a hybrid field-sequential display (HFSD) image display system wherein a monochrome display, providing the third color primary, is superimposed and optically combined with a two-primary FSD by an optical combining system, such as a dichroic prism, thereby to provide a full-color composite image to a viewer. Both displays are miniature tubes mounted on a helmet.

The invention concerns an electronic apparatus capable of producing images having the same resolution advantage as an ordinary three-primary FSD, yet using a relatively small display system. The electronic apparatus is adapted to produce full-color, high-resolution images which require a lower refresh rate from its components and provide superior color gamut and luminance. More particularly, the invention concerns an optical combining system that combines a monochrome visual display with a superimposed two-primary FSD to yield a three-primary, full-color composite image. The monochrome display may be, for example, a CRT. The invention may be incorporated in a helmet-mounted device for use in the cockpit of a military or commercial aircraft or simulator. Other helmet-mounted applications include air-traffic control, $C^3$, CAD/CAM, video-games, and amusement-park entertainment. The display system may also find use in a portable, miniature color television unit.

The HFSD uses an FSD, as currently exemplified by the penetration-tube CRT and liquid-crystal shutter technologies. The image-generating system can be a CRT, liquid-crystal display, or virtually any other display.

DETAILED DESCRIPTION

Figure 1:
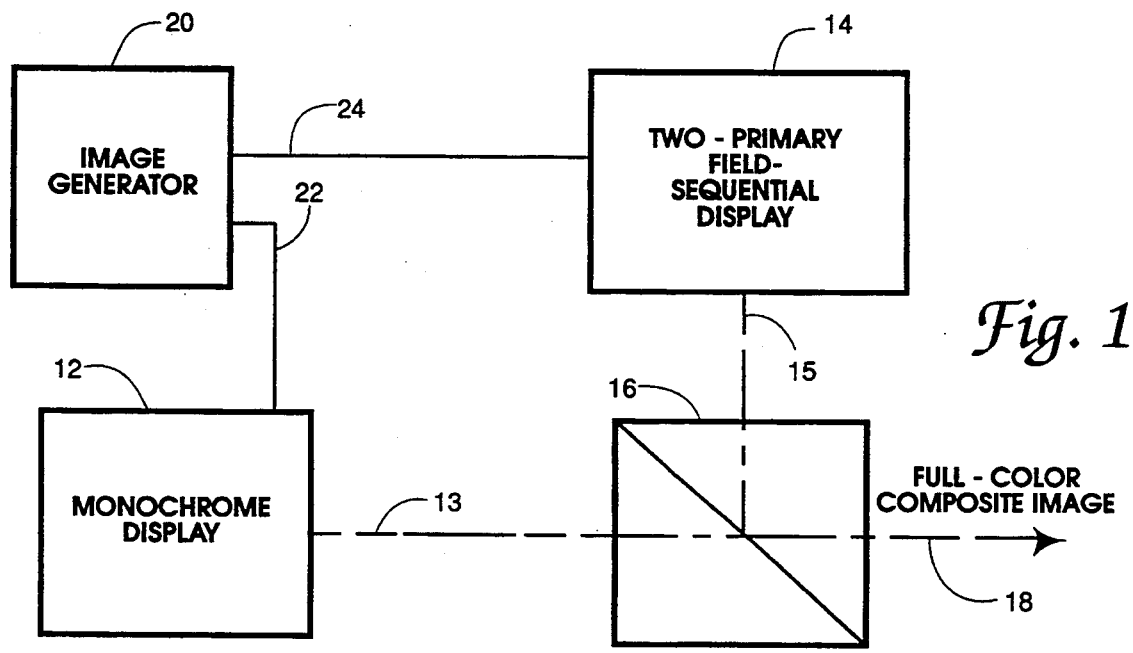
FIG. 1 is a block diagram showing a hybrid field-sequential display.

Referring to FIG. 1, the image from a monochrome display 12 (e.g., a CRT or LCD) is superimposed with that from a two-primary FSD 14 (e.g., a penetration-tube CRT, a monochrome CRT equipped with a liquid-crystal shutter, or identically equipped monochrome LCD) using an optical combining system 16. The monochrome display 12 provides the third primary color so that a full-color composite image 18 results. This image is then available for coupling with whatever optical components are needed in a given application. Both displays run at a conventional frame rate and their spatial resolution should be equal, to maximize the system's resolution. They must also be aligned properly, so that their images will superimpose. The display units 12 and 14 are controlled by a unit 20 via electric lines 22 and 24. The unit 20 may be an image generator including a computer which controls the individual images to create a desired composite image.

The monochrome display unit 12 may have a 60-Hertz frame rate, and the two-primary field-sequential display unit 14 may use temporally separate color fields which alternate at twice the 60-Hertz frame rate, namely at 120 Hertz.

Figure 2:
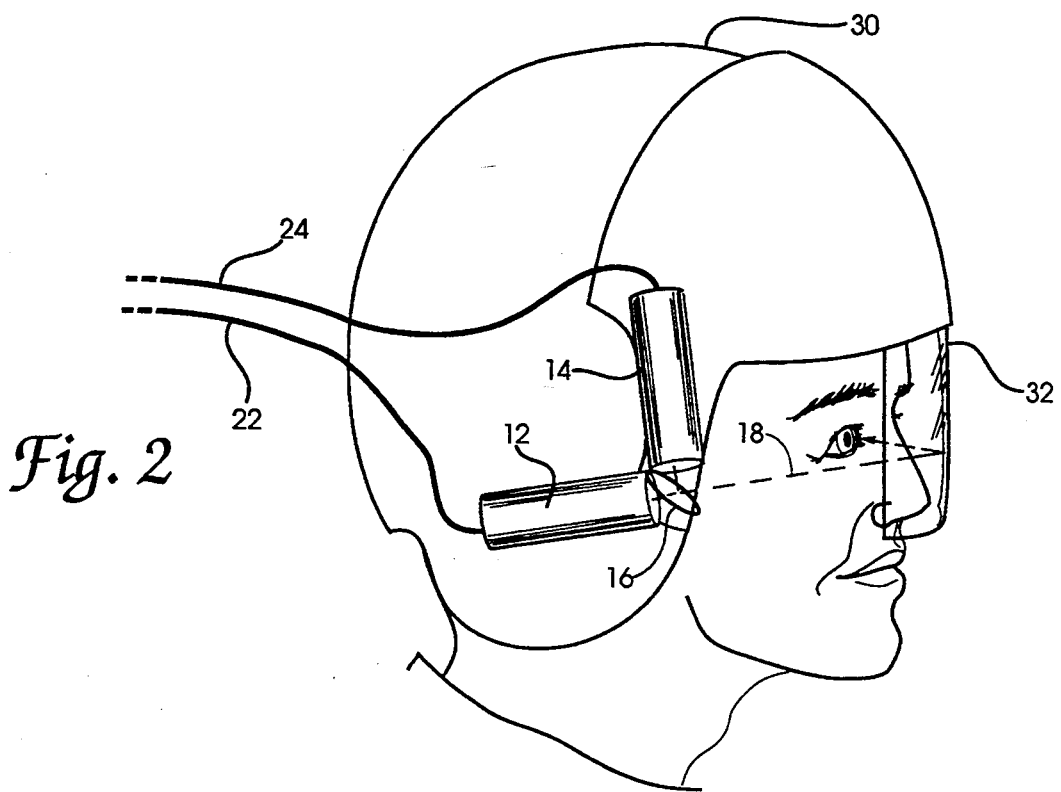
FIG. 2 shows the display mounted on a helmet.

As shown in FIG. 2, the imaging system comprising the display units 12 and 14, and the optical combiner 16 may be mounted on a helmet 30. Another combiner or reflector 32 is used to reflect the composite image 18 into a pilot's eye(s).

The display system may be made using all off-the-shelf commercial parts. Several references in the Carollo et al U.S. Pat. No. 4,427,977 show the state of the art.

Advantages and New Features

The main advantage and new feature of the HFSD is that it provides the resolution of an FBD while providing luminance and a color gamut superior to a three-primary FSD. Its refresh-rate requirement is also 33% lower than a conventional three-primary FSD and, therefore, it is more apt to be realizable using LCD technology to generate the images. Another advantage is that HFSDs can be easily constructed using contemporary technology (e.g., monochrome CRT plus two-primary penetration tube or liquid-crystal shutter CRT). Still another good point is that the presence of two displays provides redundancy in the system so that, should one display fail, the other will still provide an image. The main drawback is that the use of two displays adds weight and bulk, although it is possible that these problems can be diminished by using solid-state displays.

Alternatives

It is possible to alternate image generation on the monochrome display with image generation on the FSD. In this case, both displays present color fields at twice the frame rate and refresh in counterphase. For example, if the monochrome display is green, the color-field sequence could be: red, green, blue, green. The two green fields could be identical or constitute the two fields of 2:1 interlaced frame. These schemes would presumably require more complexity in the controlling electronics, as well as requiring a faster monochrome display and having a lower maximum luminance capability. However, they might tend to produce less flicker because the color-field rate would double to become four times the frame rate (e.g., 240 Hz, rather than 120 Hz). Note that this very high color-field rate would be achieved using displays running at only twice the frame rate. It is also possible to run the displays in phase, but this would tend to increase flicker without gaining any special advantage.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A hybrid field-sequential display (HFSD) image display system comprising a two-primary field-sequential miniature penetration-tube CRT having a diameter of less than two inches, a miniature monochrome CRT having a diameter of less than two inches which provides a third color primary, wherein the two-primary field sequential penetration-tube CRT and the monochrome CRT have substantially equal spatial resolution, optical combining means comprising a dichroic prism for superimposing and optically combining output images from the two-primary field-sequential display unit and the monochrome display unit, thereby to provide a full color composite image to a viewer, and means mounting the two-primary field-sequential miniature penetration-tube CRT, the miniature monochrome CRT, and the optical combining means on a helmet.

2. A display system according to claim 1, wherein the miniature monochrome CRT has a 60-Hertz frame rate, and the two-primary field-sequential miniature penetration-tube CRT uses temporally separate color fields which alternate at twice the 60-Hertz frame rate, namely at 120 Hertz.

3. A display system according to claim 1, wherein the two-primary field-sequential miniature penetration-tube CRT and the miniature monochrome CRT each has a diameter of approximately one inch.

* * * * *